UNITED STATES PATENT OFFICE.

EMIL JACOBSEN, OF BERLIN, GERMANY.

SULPHUR COMPOUND OF HYDROCARBON.

SPECIFICATION forming part of Letters Patent No. 495,343, dated April 11, 1893.

Application filed January 24, 1889. Serial No. 297,435. (Specimens.) Patented in Germany January 9, 1886, No. 38,416.

*To all whom it may concern:*

Be it known that I, EMIL JACOBSEN, of the city of Berlin, in the German Empire, have invented a certain new and useful Process of Manufacturing and Separating Out Sulphur Compounds of Unsaturated Hydrocarbons from Paraffine, &c.; and I do declare the following to be a full, clear, and exact specification.

This invention has been patented to me, by German patent No. 38,416, dated January 9, 1886.

My invention has for its object the production of neutral, non-hygroscopic bodies containing sulphur in chemical combination for use as medicinal or remedial agents, as well as in the arts, and my said invention consists in a novel process of obtaining these bodies, and in the product of said process, as will be fully described hereinafter.

I have found that paraffine and mineral oils that consist of unsaturated hydrocarbons, when heated in the presence of sulphur, the latter will chemically combine with the unsaturated hydrocarbons. If, on the other hand, the mineral oil or paraffine used consists of saturated and unsaturated hydrocarbons the latter alone will enter into chemical combination with the sulphur. I have fully demonstrated by experiments that no such combination takes place with the saturated hydrocarbons such as some of the petroleum residues, even when the mixture of sulphur and residues is heated to the boiling point, so that these materials cannot be used in my process of producing the neutral non-hygroscopic bodies containing sulphur in chemical combination, which form the subject matter of my invention. The latter are, however, readily obtained by heating a material consisting of unsaturated hydrocarbons or of both saturated and unsaturated hydrocarbons in the presence of sulphur forming hydrocarbon compounds with sulphur from which the said neutral non-hygroscopic bodies are obtained.

In carrying out my invention, I take, for instance, twenty (20) pounds of paraffine oil of a specific gravity of about 0.87, and containing unsaturated hydrocarbons, heat the same to about 215° centigrade, preferably in an oil bath, and gradually mix therewith about two pounds of sulphur in the form of flowers for instance, in small quantities at a time, allowing the evolution of gases, as hydrogen sulphide, to subside after each addition of sulphur.

The sulphonic acid formed by the chemical combination of the sulphur with the unsaturated hydrocarbons may be separated from the mixture in two ways, either by dissolving them out by means of alcohol, in which said acids are readily soluble, or by rendering them soluble in water by treatment with sulphuric acid. According to the first method the sulphonic acid in solution in the alcohol may be separated by distillation. According to the material treated the distillate will be more or less fluid or solid, generally of a resinous character, and of a more or less yellow or yellowish color, readily soluble in alcohol, ether, benzine and ligroin, but insoluble in water. In order that the sulphonic acid so obtained may be made soluble in water for further treatment and purification, they are first washed in water and then treated with sulphuric acid in the proportion of equal parts by weight of the acid, the latter preferably of a strength of about 1.884° Baumé, or in other words, with an acid containing 81.90 per cent. of sulphuric anhydrid ($SO_3$). When the reaction has ceased an aqueous solution of the sulphonic acid is formed for the purposes hereinafter set forth. As above stated the sulphonic acid may be separated from the mixture by first rendering them soluble in water by treating the mixture with sulphuric acid, and this method I prefer as being the simpler and most expeditious. The mixture after treatment with the sulphuric acid being poured into water to dissolve out the soluble sulphonic acids. The latter are now salted out by the addition to the mixture of a readily soluble indifferent salt, as common salt, the sulphonic acids rising to the surface of the mixture, from which they are removed and washed in water.

The final purification of the product may be effected by first dissolving in ligroin, for the purpose of removing any mineral oil present; then treating with an alkali, as ammonia for the purpose of neutralizing any remaining acid, and finally salting out the neutral product. Or, the soluble sulphonic acid may again be dissolved in water, an alkali added to the solution, and then ligroin, and the neutral product salted out. The body or substance so obtained may be freed from salt by dialysis, the product being then dried at a temperature of about 70° centigrade. Halogen compounds may readily be obtained by the addition to an aqueous solution of the neutral hydrocarbon sulphides, of bromine, for instance. The final dried product is either foliated or pulverulent according to the mode of treatment, of a dark brown color, perfectly soluble in water; it is non-hygroscopic, absolutely neutral, that is to say, has no acid reaction, and is almost inodorous and tasteless. It is adapted not only as a medicinal or remedial agent, applicable both internally and externally, but is also adapted for use in the arts, as for instance, in the manufacture of pyrotechnic materials or explosives, by combining the product with nitrates or similar bodies rich in oxygen, in the manufacture of silver, gold, and platinum pigments for decorating china, and as an insecticide for the destruction of parasites, for which purpose the crude sulphonic acid is particularly well adapted.

Having thus described my invention, what I claim as new therein, and desire to secure by Letters Patent, is—

1. The herein-described process of obtaining neutral non-hygroscopic hydrocarbon bodies containing sulphur in chemical combination, which consists in combining sulphur by means of heat with a hydrocarbon free from sulphur, rendering the sulphonic acid so obtained soluble in water by treating the same with sulphuric acid, separating the crude soluble product, purifying, neutralizing, and drying the same.

2. The herein-described process of obtaining neutral non-hygroscopic hydrocarbon bodies containing sulphur in chemical combination, which consists in combining sulphur by means of heat with a hydrocarbon free from sulphur, allowing the mixture to cool, treating the same with sulphuric acid, separating the soluble sulphonic acid, forming a solution thereof after being freed from adhering acid, neutralizing the said solution by the addition thereto of an alkali, removing any remaining mineral oil by means of ligroin or other like substance, and finally salting out the neutral product.

3. As an article of manufacture, the herein-described neutral hydrocarbon body, which consists of compounds of unsaturated paraffines or mixtures containing unsaturated paraffine, combined with sulphur, derived from such paraffine as contains sulphur, said body being non-hygroscopic, of a foliated or pulverulent form, readily soluble in water and nearly devoid of taste and smell.

In witness whereof I have hereunto signed my name in the presence of two subscribing witnesses.

EMIL JACOBSEN.

Witnesses:
CARL A. THEURER,
ADOLF BENDER.